(12) United States Patent
Yang et al.

(10) Patent No.: US 11,738,282 B2
(45) Date of Patent: Aug. 29, 2023

(54) MAGNETIC POSITIONING MECHANISM FOR FLUID-SUPPORTED SELF-ROTATING DISPLAYS

(71) Applicant: TURTLETECH DESIGN, INC., Solana Beach, CA (US)

(72) Inventors: Chun-Hsien Yang, Taichung (TW); Shawyueh Lin, San Diego, CA (US); Ai-Chin Chiang, San Diego, CA (US)

(73) Assignee: TurtleTech Design, Inc., Santa Fe Springs, CA (US)

( * ) Notice: Subject to any disclaimer, the term of this patent is extended or adjusted under 35 U.S.C. 154(b) by 0 days.

(21) Appl. No.: 17/196,055

(22) Filed: Mar. 9, 2021

(65) Prior Publication Data

US 2021/0187405 A1    Jun. 24, 2021

Related U.S. Application Data

(63) Continuation of application No. 16/082,909, filed as application No. PCT/US2017/021547 on Mar. 9, 2017, now abandoned.

(60) Provisional application No. 62/307,268, filed on Mar. 11, 2016.

(51) Int. Cl.
| | |
|---|---|
| *A63H 23/08* | (2006.01) |
| *G09F 11/23* | (2006.01) |
| *G09F 19/02* | (2006.01) |
| *G09B 27/08* | (2006.01) |
| *A63H 33/26* | (2006.01) |

(52) U.S. Cl.
CPC ............. *A63H 23/08* (2013.01); *A63H 33/26* (2013.01); *G09B 27/08* (2013.01); *G09F 11/23* (2013.01); *G09F 19/02* (2013.01)

(58) Field of Classification Search
CPC ........ A63H 23/08; A63H 33/26; G09B 27/08; G09F 11/23; G09F 19/02; G09F 9/375
See application file for complete search history.

(56) References Cited

U.S. PATENT DOCUMENTS

| | | | |
|---|---|---|---|
| 2005/0102869 A1* | 5/2005 | French ................... | G09F 19/02 40/414 |
| 2006/0154217 A1* | 7/2006 | Pachler .................. | G09B 27/08 434/131 |
| 2007/0010164 A1* | 1/2007 | Kowalski ............. | A63H 33/042 446/485 |
| 2008/0025026 A1* | 1/2008 | Lee .......................... | F21V 3/02 362/253 |
| 2017/0316724 A1* | 11/2017 | Ohno ....................... | H01F 1/34 |

* cited by examiner

*Primary Examiner* — Michael D Dennis
(74) *Attorney, Agent, or Firm* — Charmasson, Buchaca & Leach, LLP

(57) ABSTRACT

A self-rotating display device (1) includes and outer light transmissive container (2) containing a light transmissive fluid (6) and a body (4) containing an electric motor (14) for rotating the body with respect to the outer container. The body also carries a compass magnet (18) as a source of counter-torque for the motor to operate against. A magnetic positioning structure (20) made of ferromagnetic material secured to the container interacts with the magnetic field of the compass magnet to cause the body to migrate toward a location minimizing the distance between the magnetic positioning structure and compass magnet, so that the body can remain centered within the display while rotating.

12 Claims, 6 Drawing Sheets

MAGNETIC POSITIONING MECHANISM FOR FLUID-SUPPORTED SELF-ROTATING DISPLAYS

PRIOR APPLICATION

This is a continuation of U.S. patent application Ser. No. 16/082,909, filed 2018 Sep. 6, which is a 371 of International Patent Application No. PCT/US2017/021547, filed 2017 Mar. 9, which claims the benefit of U.S. Provisional Patent Application Ser. No. 62/307,268, filed 2016 Mar. 11, all of which are incorporated herein by reference.

FIELD OF THE INVENTION

The invention relates to self-powered display devices, and more particularly, to fluid supported, light-powered, electric motor driven self-rotating devices.

BACKGROUND

Self-moving displays are often used as toys, decorative conversation pieces or advertising media. Such devices are disclosed in U.S. Pat. Nos. 6,275,127; 6,853,283; 6,937,125; and U.S. Pat. Publication No. 2005/0102869; all of which are incorporated herein by reference.

These devices can have a sealed outer container having light-transmissive walls containing a light-transmissive liquid which buoyantly supports an inner body which appears to magically rotate on its own with respect to the outer container, or in what appears to be a solid block of clear glass or plastic. The rotation can be driven by an electric motor hidden within the body. The motor can be powered by a battery or in a longer-term manner by light radiation impacting on photovoltaic cells hidden within the body. Because the drive mechanism can be fully contained within the self rotating body, an internal compass magnet aligned with an ambient magnetic field such as the earth's magnetic field is used to act as a source of counter-torque for the internal motor.

One problem that can occur with floating, self-rotating devices involves the self-rotating body not being centered within the container, but rather bumping up against or resting against one of the container side walls. Although a rotating body can tend to move itself away from sidewall due to sheer forces encountered near the sidewall, there is no guarantee the object will remain centered, especially when the container is large and the rotating body small.

When the self-rotating body has stopped rotating for an extended period, such as during nighttime when no power-giving light falls on the photovoltaic powering elements, slight surface-tension-related forces tend to cause the non-rotating body to drift over and eventually contact a sidewall. When a non-rotating body is at rest against a sidewall, there can be significant static friction existing between the body and the sidewall surface which is difficult for a typically low-torque drive mechanism to overcome.

Therefore there is a need for a self-rotating device which addresses some or all of the above identified inadequacies.

SUMMARY

The principal and secondary objects of the invention are to provide an improved fluid supported, self-rotating device. These and other objects are achieved by a magnetic positioning structure fixed with respect to a container of a fluid supported, self-rotating body.

In some embodiments the self rotating body is bouyantly supported within the container by two different density immiscible fluids.

In some embodiments there is provided a self-rotating device comprises: a container carrying a fluid; a self-powered hollow rotating body buoyantly supported by said fluid; wherein said body comprises: an axis of rotation; an electric motor comprising: a counter-torque element rotationally responsive to an ambient magnetic field; and, wherein said device further comprises: a magnetic positioning structure fixed with respect to said container, a local magnetic field generated by at least one of said magnetic positioning structure and said counter-torque element; wherein said magnetic positioning structure is located an effective distance from said counter-torque element so as to interact with said local magnetic field to bias said body toward a position of magnetic equilibrium between said magnetic positioning structure and said counter-torque element.

In some embodiments said counter-torque element is a compass magnet aligned to said ambient magnetic field.

In some embodiments said ambient magnetic field is the earth's magnetic field.

In some embodiments said magnetic positioning structure comprises a positioning magnet generating a multipurpose magnetic field providing both said ambient magnetic field and said local magnetic field.

In some embodiments said positioning magnet is a permanent magnet.

In some embodiments said container comprises a light transmissive outer wall; and wherein said fluid comprises a light transmissive liquid.

In some embodiments said position of magnetic equilibrium minimizes a distance between said counter-torque element and magnetic positioning structure.

In some embodiments said position of magnetic equilibrium is located so that said axis of rotation intersects a region occupied by said magnetic positioning structure.

In some embodiments said axis passes through a void bounded by said magnetic positioning structure.

In some embodiments said effective distance is less than about 5 centimeters.

In some embodiments said local magnetic field generates a biasing force which is insufficient to overcome a buoyancy force buoyantly supporting said body against gravity.

In some embodiments said local magnetic field generates a biasing force which is insufficient to overcome a force of gravity acting on said body.

In some embodiments said magnetic positioning structure comprises an amount of ferromagnetic paint coating a portion of said container.

In some embodiments said fluid comprises two different density liquids, wherein said liquids are selected to buoyantly support said body within said container.

In some embodiments said device further comprises a light transmissive outer enclosure forming said container, wherein said enclosure is shaped and dimensioned to have an internal cavity containing an amount of a light transmissive liquid forming said fluid and said self-powered hollow rotating body being immersed in said liquid.

In some embodiments said local magnetic field has a strength which cannot overcome the weight of said body.

The original text of the original claims is incorporated herein by reference as describing features in some embodiments.

DESCRIPTION OF THE EXEMPLARY EMBODIMENTS

Figure 1:
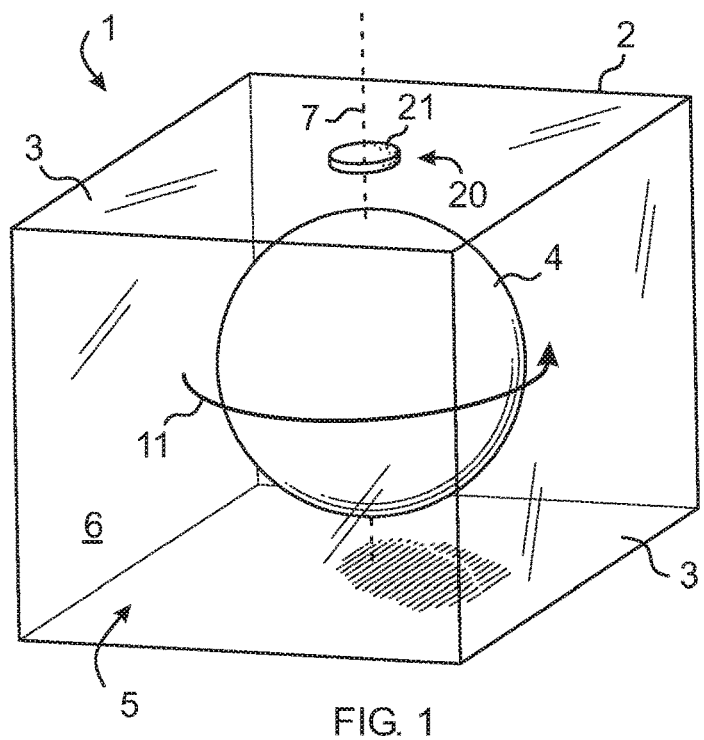
FIG. 1 is a graph shows how the speed of rotation can vary with rotation angle in prior art devices.
Figure 2:
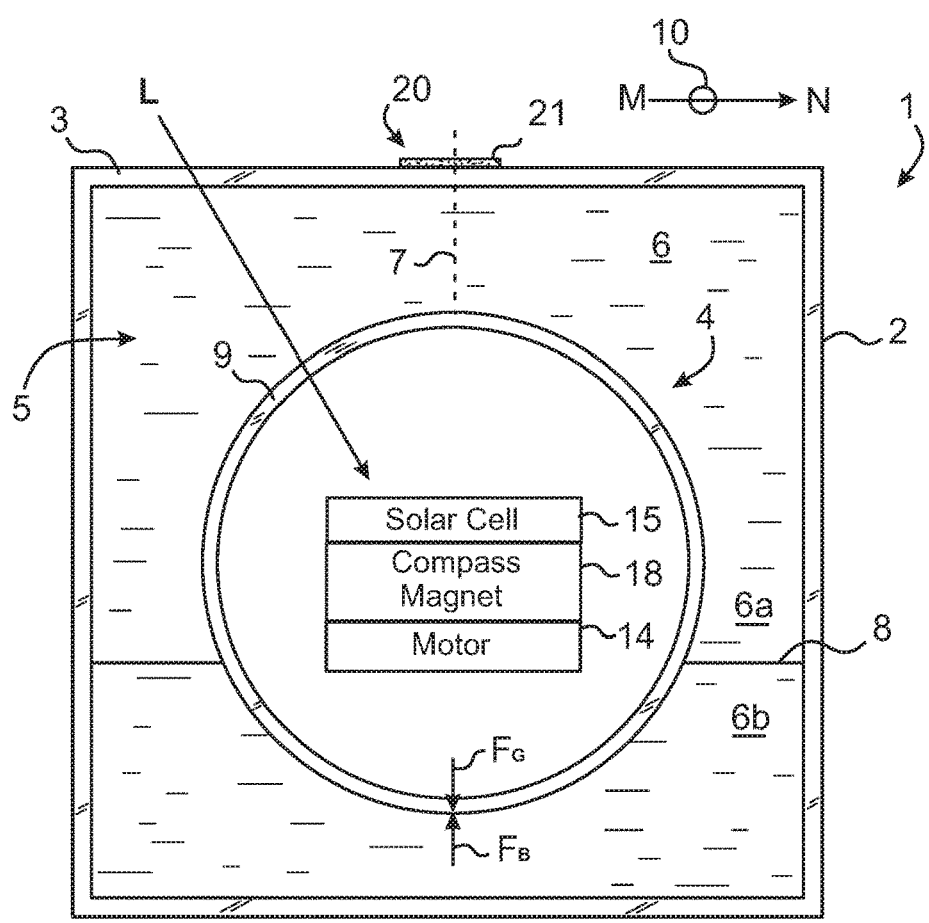
FIG. 2 is a diagrammatic cross-sectional side view representation of a light driven, motor containing, rotating body immersed in a light transmissive fluid contained in a light transmissive outer container including a magnetic positioning structure according to an exemplary embodiment of the invention.
Figure 3:
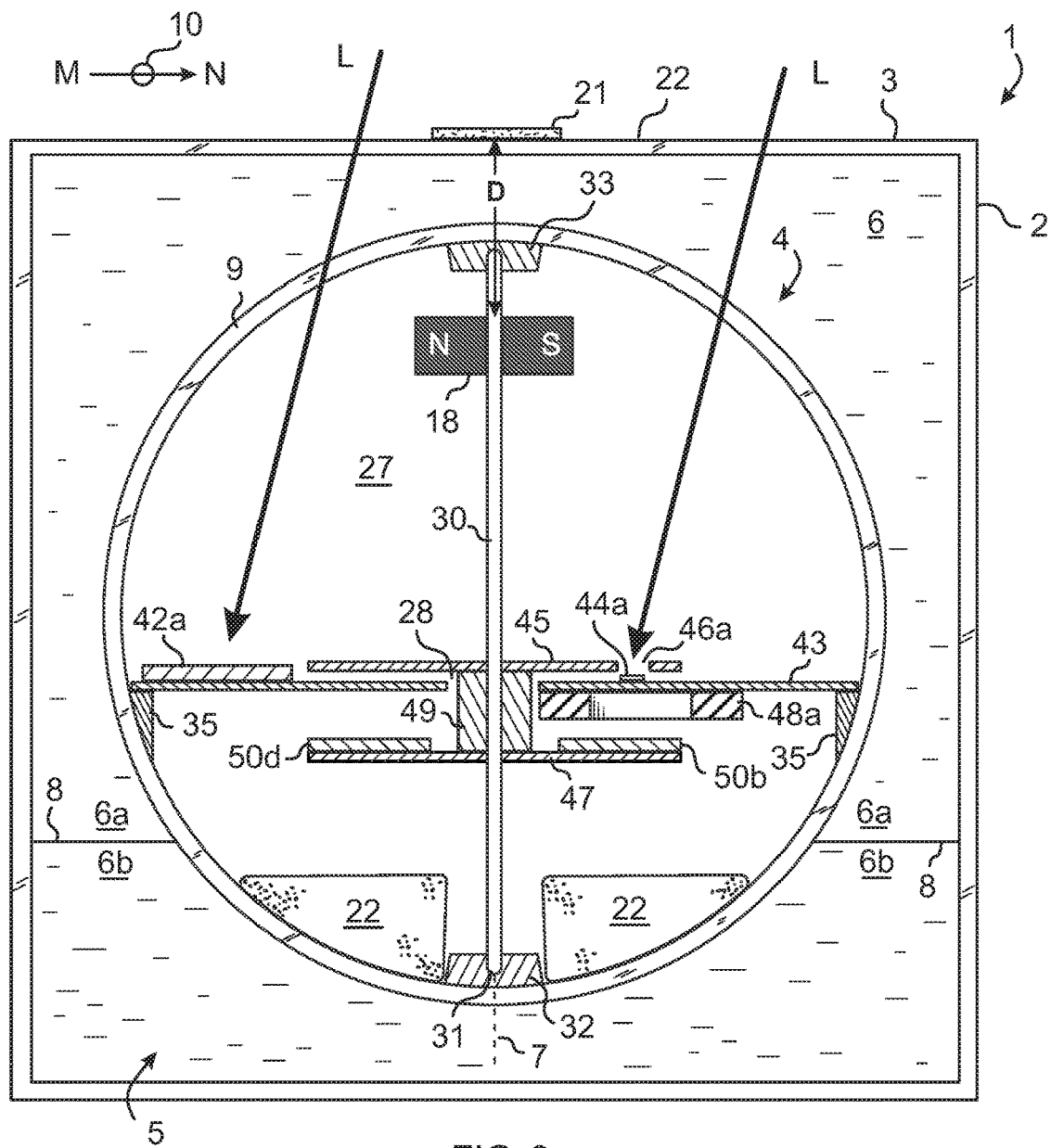
FIG. 3 is a diagrammatic cross-sectional side view representation of the device of FIG. 2 in greater detail.

Referring now to the drawing there is shown in FIGS. 1-3 a self-rotating device 1 having a substantially stationary, sealed outer container 2 having light transmissive walls 3 forming an enclosure surrounding an inner cavity 5 containing an amount of light transmissive fluid 6, and an axially symmetrically shaped body 4 such as a sphere or ball which is immersed in the fluid and allowed to rotate 11 about an axis 7 with respect to the outer container. The body has a light-transmissive wall 9 allowing ambient light rays L to pass through the outer container wall 3, fluid 6, and body wall 9 to provide power to a solar cell 15 supplying current to an electric motor 14 inside the body. The axially symmetric shape of the body allows it to rotate with a minimum amount of drag from contacting the surrounding fluids. A compass magnet 18 within the body is rotationally responsive to an ambient magnetic field 10 such as the earth's magnetic field to align with it and provide a counter-torque element for the motor to turn against.

The fluid 6 can comprise two immiscible liquids, namely a less dense liquid 6a, and a more dense liquid 6b, separated at an interface 8 as disclosed in French, U.S. Pat. Publication No. 2005/0102869 incorporated herein by reference. The index of refraction of the two liquids is selected to be substantially similar in order to hide the appearance of the interface. The density of the liquids is further selected to provide a buoyancy force $F_B$ which equally counteracts the force of gravity $F_G$ so that the body is suspended vertically within the inner cavity 5.

Figure 4:
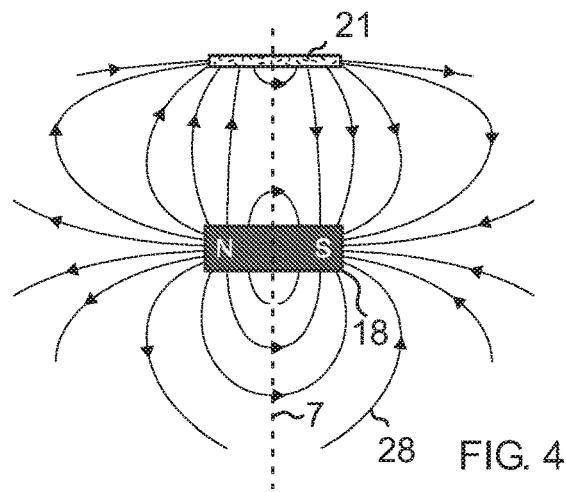
FIG. 4 an magnetic field diagram for the magnetic positioning structure components of the device of FIG. 2.
Figure 5:
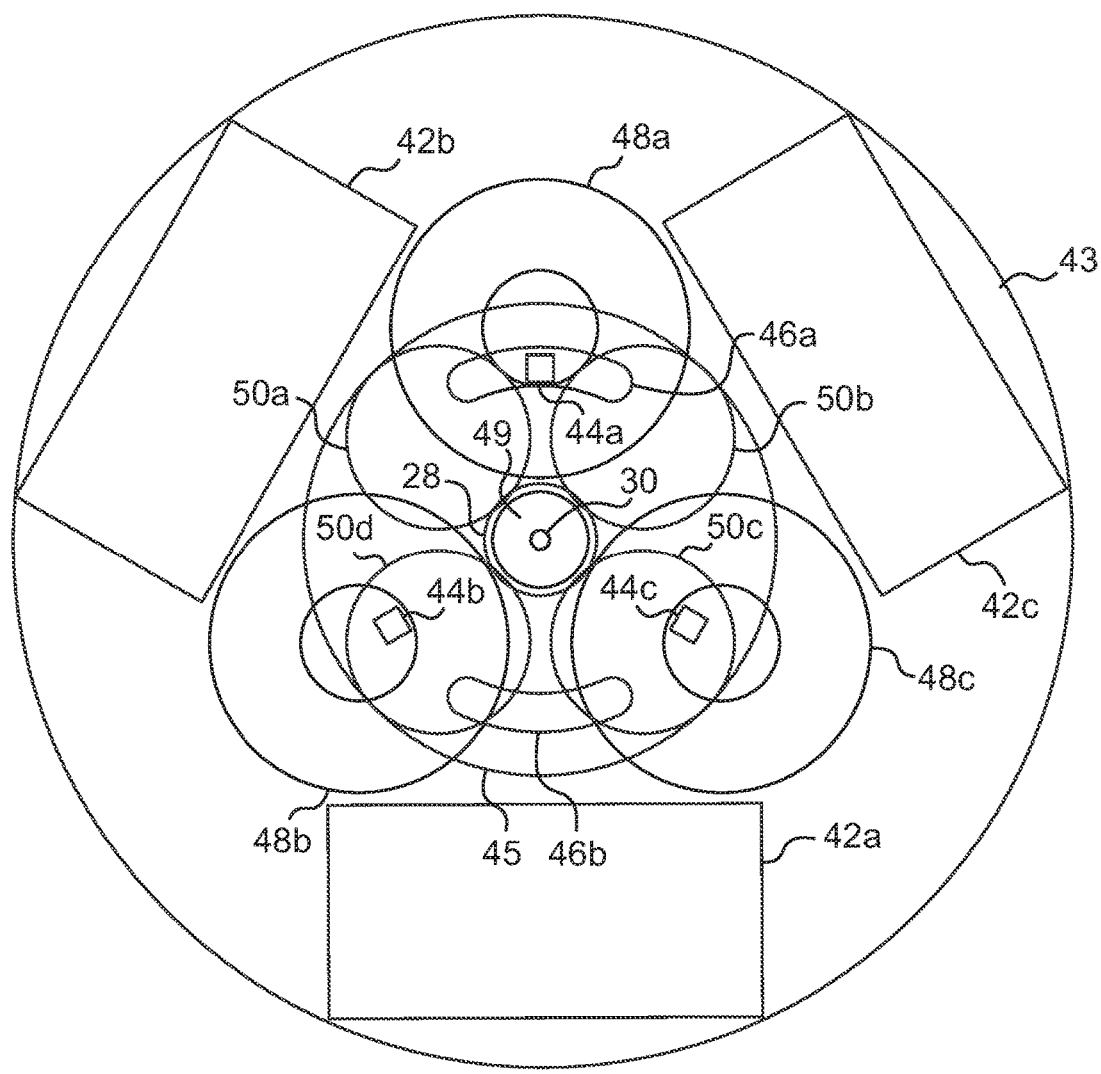
FIG. 5 is a diagrammatic top partial transparent view of certain motor elements of FIG. 3.

The device of FIGS. 1 and 2 is shown in greater detail in FIGS. 3-6. FIG. 5 shows a top view of the structure of FIG. 3, with its major parts shown in transparency for clarity. It shall be noted that the angular orientation of the rotating parts of the drive mechanism are different between FIGS. 3 and 5.

The substantially spherical body 4 floats on the denser liquid 6b carried within the container 2. The body is hollow having an internal chamber 27 which carries a self-contained drive mechanism for causing the body to rotate. The drive mechanism can include a vertical shaft 30 connected to a compass magnet 18, a top iron disk 45, a spacer 49, and a bottom iron disk 47. The shaft 30 is supported on the bottom by a hard rounded ball end 31 resting in a cup jewel bearing 32. A top bearing 33 rotatively engages the top of the shaft. A ring shaped ballast weight 22 orients the body so that its rotation axis 7 is vertical.

A printed circuit board 43 is connected to the spherical wall 9 by a number of gussets 35. The printed circuit board carries three uniformly angularly spaced apart solar cells, 42a,42b,42c and three uniformly angularly spaced apart photodiodes, 44a,44b,44c mounted on the top of the printed circuit board. Three uniformly angularly spaced apart bobbins wound with wire forming coils 48a,48b,48c are shown mounted on the bottom of the printed circuit board. The spacer 49 passes through a hole 28 in the printed circuit board and the shaft 30 is in the center of the spacer 49.

Four uniformly angularly spaced apart disk shaped magnets 50a,50b,50c,50d can be mounted on the lower iron disk 47, two of which, 50a and 20b are shown in FIG. 3.

As the printed circuit board 43 rotates with respect to the iron disks 45,47, each photodiode 44a,44b,44c is shaded by the upper iron disk 45 until it passes under one of the apertures 46a,46b. In FIG. 5, the photodiode 44a is shown passing under aperture 46a, and photodiodes 44b and 44c are shaded by the top iron disk 45. While under the aperture, photodiode 44a is exposed to light and opens its respective transistor 51a which delivers current to its coil 48a.

Figure 6:
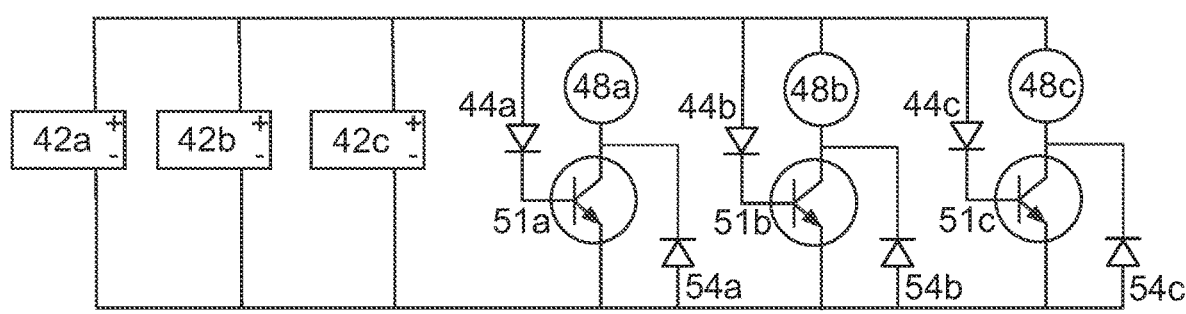
FIG. 6 an electrical circuit diagram for the electrical components of the body of FIG. 3.

FIG. 6 shows the electronic circuit on the printed circuit board 43. Light falling on any of the photodiodes 44a,44b, 44c will create a current that opens its respective transistor 51a,51b,51c to drive current through its respective coil 48a,48b,48c. Diodes 54a, 54b,54c protect the transistors in case any reverse voltage is generated if the relative rotation of the coils 48a,48b,48c and magnets 50a,50b,50c,50d is somehow forced to happen in reverse. Solar cells 42a,42b, 42c provide voltage to drive the circuit.

In the relative orientation of the printed circuit board 43 to the iron disks 45,47 shown in FIG. 3, the coil 48a will be receiving current because photodiode 44a is illuminated and this current will create a relative torque between the coil 48a and the magnets 50a and 50b. Once again, the shaft 30 is held from rotating by the interaction of the compass magnet 18 with an ambient horizontal magnetic field 10 such as the earth's magnetic field. The net result will be that the coil 48a, the printed circuit board 43 and hence the body 4 will feel a torque and start to rotate if the body is in a low friction environment such as described above. Continued rotation will eventually cause photodiode 44a to be shaded and expose another photodiode 44b or 44c to be exposed through aperture 46b and this will cause continued rotation.

As shown in FIGS. 1-4, the device includes a magnetic positioning structure 20 fixed with respect to the container 2. The magnetic positioning structure can be an amount of ferromagnetic material paint coating a portion of the container, or a chip 21 of ferromagnetic material such as steel adhered or otherwise fixed with respect to the container, that interacts with a local magnetic field 28 generated by the counter-torque-providing compass magnet 18 to cause the body to be magnetically drawn laterally toward the chip. The chip can be positioned atop the outer surface 22 of the container a laterally central location. By placing the chip in a laterally central location with respect to the inner cavity 5 of the container, the body is biased toward a location vertically adjacent to the chip, thereby laterally positioning the body within the cavity. When the body 4 has reached a centered lateral position within the inner cavity 5 directly below the chip 21, the chip and compass magnet 18 can be said to be in equipoise, in other words, a position of magnetic equilibrium. In this equipoise position the rotational axis 7 of the body will tend to intersect a region occupied by the chip which is often the center of mass of the chip for most simple chip shapes. It is important to note that the flat bottom of the container can preserve the orientation of the container at rest on a flat surface such as a table top. The preserved orientation is important to keep the magnetic positioning structure properly located over the center of the cavity, and thus drive the body toward an equipoise position.

As shown in FIGS. 3 and 4, the magnetic attraction between the steel chip 21 and the compass magnet 18 provides a lateral force component on the self-rotating body 4 urging it toward a position of vertical adjacency with the chip and minimizing a distance D between the chip and the compass magnet. Of course the chip must be located an effective distance from the magnetic counter-torque element 18 so as to interact with its local magnetic field 28 in order to bias it toward the chip even when the body has drifted toward the lateral boundaries of the inner cavity 5. The effective distance is determined by the strength of the magnetic field generated by the compass magnet and the mass of the chip and its ability to interact with that magnetic field. For a compass magnet having a strength of approximately 600 gauss and a chip of 403 type steel having a mass of 0.5 grams, the maximum separation between the chip and compass magnet should be no more than 2 centimeters when in equipoise and the effective distance no more than about 5 centimeters.

It shall be understood that the biasing force can be very weak and still be effective at laterally positioning the body within the inner cavity since there are no appreciable lateral forces to overcome. It is important to note that, when the chip is located on the top of the container, the biasing force is insufficient to overcome the weight of the body due to gravity, and the body may only experience a slight increase in buoyancy.

Figure 7:
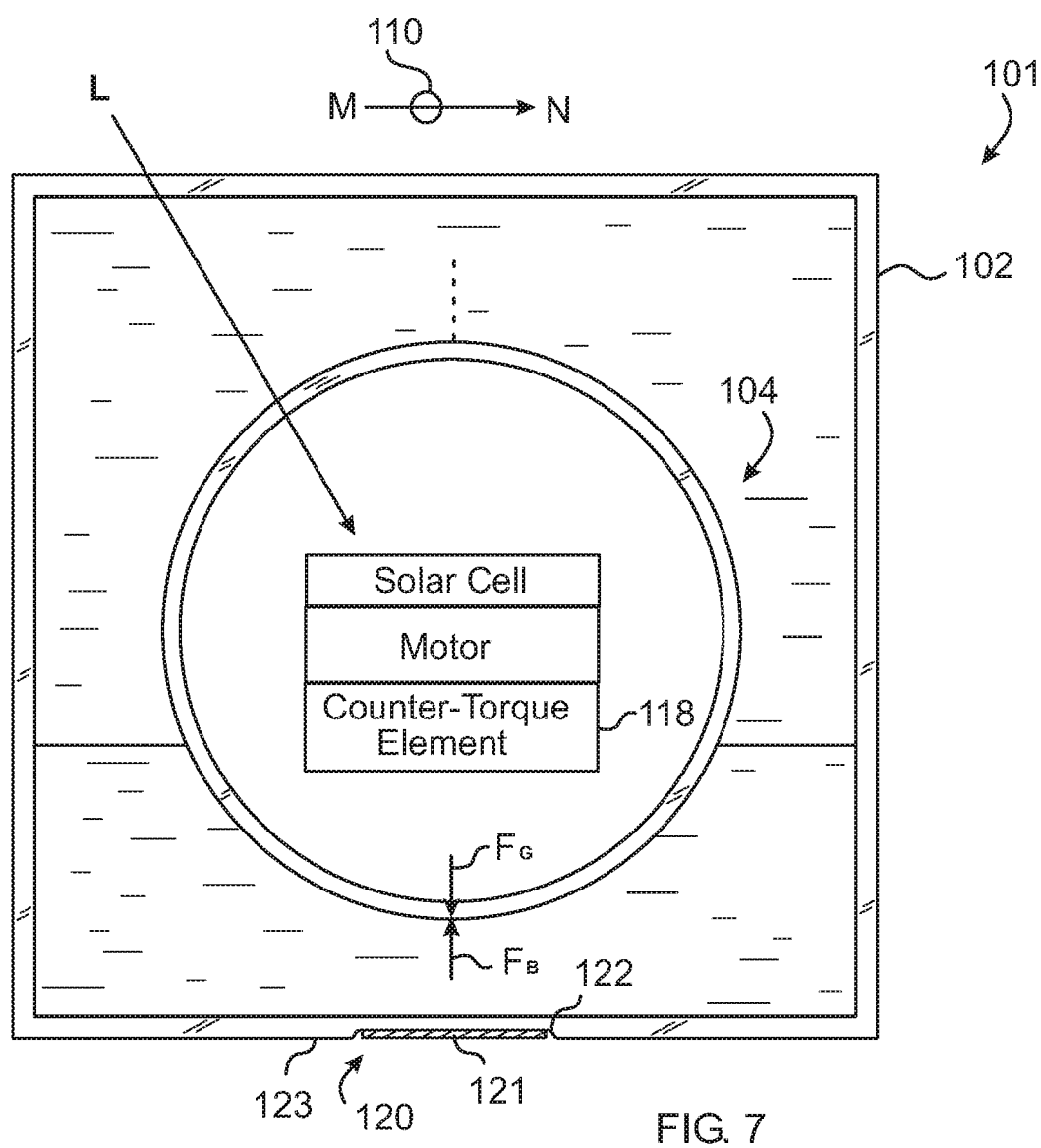
FIG. 7 is a diagrammatic cross-sectional side view representation of a self-rotating device including a bottom mounted magnetic positioning structure according to an alternate exemplary embodiment of the invention.

In FIG. 7 there is shown an alternate embodiment of a self-rotating device 101 similar to the device of FIG. 2. However, in this embodiment the chip 121 is conveniently and inconspicuously positioned and fixed in a non-rotating manner to a depression 122 set into the outer under-surface 123 of the bottom of the container 102 at a laterally central location. Indeed, when the chip is located on the bottom of the container, the biasing force is insufficient to overcome a buoyancy force $F_B$ buoyantly supporting the body 104 against the force of gravity $F_G$. The counter-torque element 118 such as a compass magnet, magnetically anchored to an ambient magnetic field such as the earth's magnetic field 110 can be located in a position closer to the bottom of the container ensuring an effective distance between the chip and the magnetically anchored counter-torque element.

Figure 8:
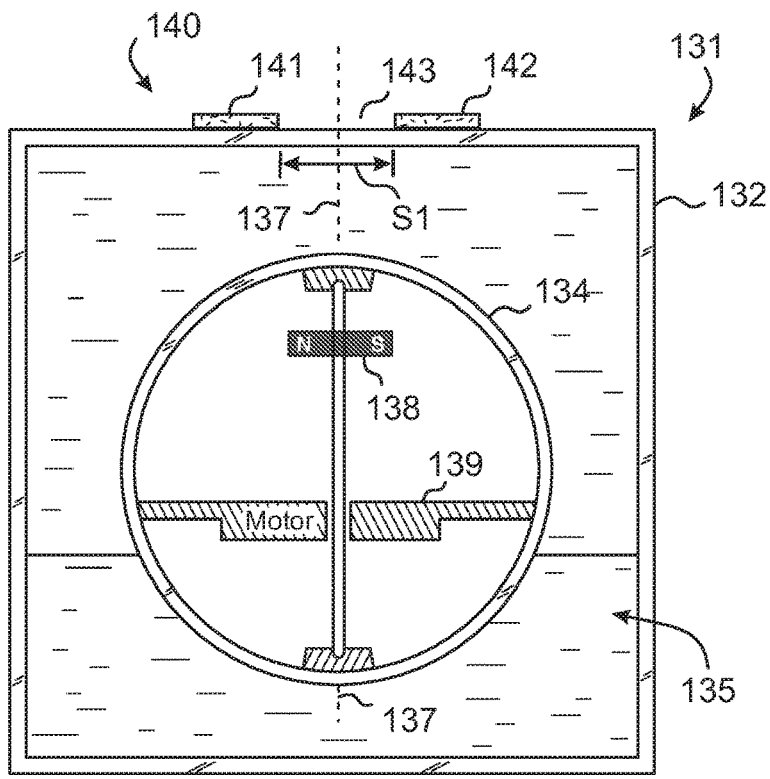
FIG. 8 is a diagrammatic cross-sectional side view representation of a self-rotating device including a split chip magnetic positioning structure according to an alternate exemplary embodiment of the invention.

In FIG. 8 there is shown an alternate embodiment of a self-rotating device 131 similar to the device of FIG. 2. However, in this embodiment the magnetic positioning structure 140 includes a pair of ferromagnetic chips 141,142 that are spaced a distance S1 apart from one another and secured to the top surface of the container 132. The chips are positioned so that their aggregate center of mass is located at a laterally central location. When the chips interact with the local magnetic field generated by a compass magnet 138 acting as a counter-torque element for the motor 139 the body 134 is biased laterally toward the lateral center of the cavity 135 until the compass magnet and chips are in equipoise. Once in equipoise the rotational axis 137 of the body substantially intersects the center of mass of the magnetic positioning structure which is located at a void 143 residing between the two chips and thus bounded by the magnetic positioning structure.

Figure 9:
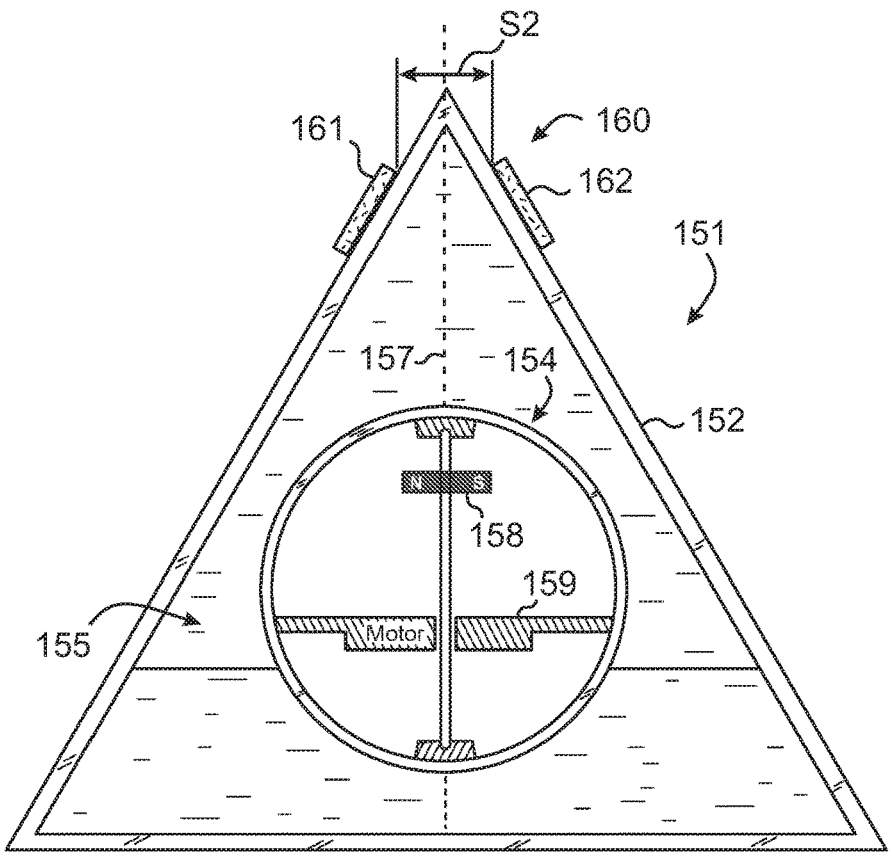
FIG. 9 is a diagrammatic cross-sectional side view representation of a pyramid shaped self-rotating device including a split chip magnetic positioning structure according to an alternate exemplary embodiment of the invention.

In FIG. 9 there is shown an alternate embodiment of a self-rotating device 151 similar to the device of FIG. 8. However, in this embodiment it is shown by way of example that the container 152 can be one an endless variety of shapes. In this embodiment the container is in the shape of a four-sided pyramid. The drive and positioning mechanisms can operate in the same manner as for those embodiments described above. The magnetic positioning structure 160 includes a pair of ferromagnetic chips 161,162 that are spaced a distance S2 apart from one another and secured to an upper surface of the container 132. The chips are positioned so that their aggregate center of mass is located at a laterally central location. When the chips interact with the local magnetic field generated by a compass magnet 158 acting as a counter-torque element for the motor 159 the body 154 is biased laterally toward the lateral center of the cavity 155 until the compass magnet and chips are in equipoise. Once in equipoise the rotational axis 137 of the body substantially intersects the center of mass of the magnetic positioning structure which is located at a void 143 residing between the two chips.

It shall be understood that the positioning mechanism can be used to bias the body toward essentially any lateral position within the cavity and not necessarily the center of the cavity.

Figure 10:
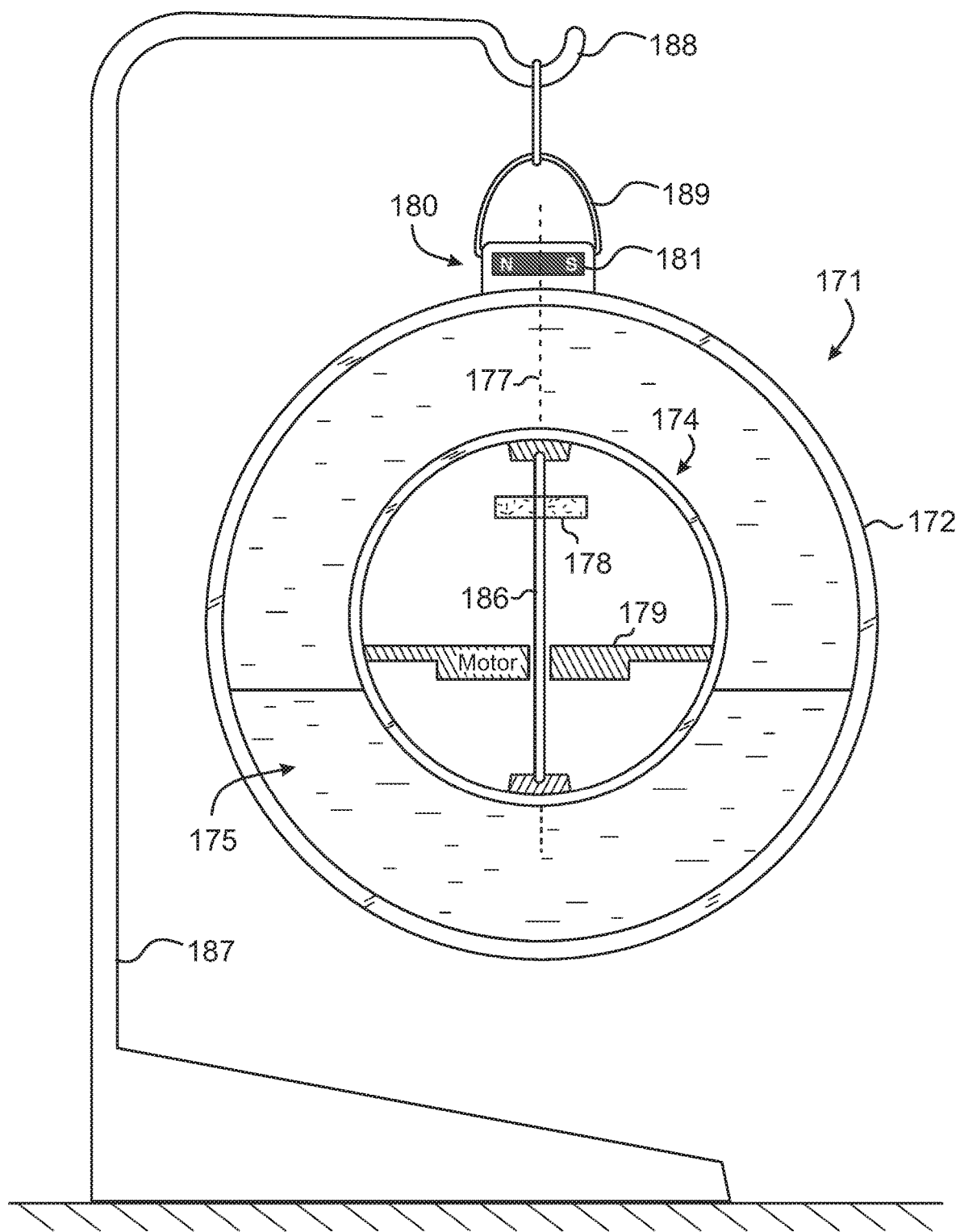
FIG. 10 is a diagrammatic cross-sectional side view representation of a suspended container self-rotating device including an outboard magnet magnetic positioning structure according to an alternate exemplary embodiment of the invention.

In FIG. 10 there is shown an alternate embodiment of a self-rotating device 171 wherein a generally spherically shaped container 172 is suspended on a stand 187 by a hook 188 engaging a looped crown 189. In this embodiment a magnetic positioning structure 180 includes a container magnet 181 connected to the container generating an ambient magnetic field with respect to the container. A piece of ferromagnetic material such as steel is connected to the shaft 186 of the body 174 to act as a counter-torque element. In this embodiment the container magnet generates a multipurpose magnetic field which acts as both the ambient magnetic field to anchor the counter-torque element and as the local magnetic field for positioning purposes. In other words, the container magnet generates a magnetic field which both anchors the rotational position of the anti-torque element and biases the element toward an equipoise position so that the rotational axis 177 of the body intersects the container magnet. The looped crown maintains the orientation of the container with respect to the magnetic positioning structure to keep it centered over the cavity.

EXAMPLE

A outer substantially cubic hollow container made of transparent acrylonitrile butadiene styrene (ABS) having a wall thickness of about 5 millimeters and sides measuring about 15 centimeters square loosely carries a hollow spherical body of transparent ABS having a wall thickness of about 3 millimeters and a diameter of about 10 centimeters. The body is buoyantly supported inside the container by two immiscible, different density liquids. The first, higher density liquid is a mixture of about 81% by volume propylene glycol and 19% by volume water. The second, lower density liquid is dodecane. The body is formed by two hemispherical shells bonded along an equator by an amount of adhesive. A cylindrical compass magnet having a length of about 2 centimeters is used as the internal counter-torque element. A steel chip formed into a logo emblem having a thickness of about 2 millimeters and a diameter of about 1.5 centimeters was selected and mounter adhesively to the center of the top surface of the container. The magnetic interaction between the steel chip and compass magnet was observed over a distance of about 5 centimeter effectively biasing the body to equipoise.

While the exemplary embodiments of the invention have been described, modifications can be made and other embodiments may be devised without departing from the spirit of the invention and the scope of the appended claims.

What is claimed is:

1. A self-rotating device comprises:
   a container carrying a fluid;
   a self-powered hollow rotating body buoyantly supported by said fluid;
   wherein said body comprises:
      an axis of rotation;
      an electric motor contained inside said body, said electric motor comprising:
         a counter-torque element rotationally responsive to an ambient magnetic field; and,
   wherein said device further comprises:
      a magnetic lateral positioning structure apart from said body and apart from said electric motor, wherein said magnetic lateral positioning structure is fixed and adhered to a bottom part of said container in a non-rotating manner to said container, and wherein said magnetic lateral positioning structure has an aggregate center of mass located along said axis of rotation,
      a local attractive magnetic force between said magnetic lateral positioning structure and said counter-torque element;
      wherein said local attractive magnetic force has a strength which is insufficient to overcome a buoyancy of said body;
      wherein said magnetic lateral positioning structure is located an effective distance from said counter-torque element so as to laterally bias said body toward a position of magnetic equilibrium between said magnetic lateral positioning structure and said counter-torque element.

2. The device of claim 1, wherein said counter-torque element is a compass magnet aligned to said ambient magnetic field.

3. The device of claim 2, wherein said ambient magnetic field is the earth's magnetic field.

4. The device of claim 1, wherein said magnetic lateral positioning structure is a permanent magnet.

5. The device of claim 1, wherein said container comprises a light transmissive outer wall; and wherein said fluid comprises a light transmissive liquid.

6. The device of claim 1, wherein said counter-torque element and magnetic lateral positioning structure are vertically aligned.

7. The device of claim 1, wherein said position of magnetic equilibrium is located so that said axis of rotation intersects a region occupied by said magnetic lateral positioning structure.

8. The device of claim 7, wherein said axis passes through a void bounded by said magnetic lateral positioning structure.

9. The device of claim 1, wherein said effective distance is less than about 5 centimeters.

10. The device of claim 1, wherein said magnetic lateral positioning structure comprises an amount of ferromagnetic paint coating a portion of said container.

11. The device of claim 1, wherein said fluid comprises two different density liquids, wherein said liquids are selected to buoyantly support said body within said container.

12. The device of claim 1, wherein said device further comprises a light transmissive outer enclosure forming said container, wherein said enclosure is shaped and dimensioned to have an internal cavity containing an amount of a light transmissive liquid forming said fluid and said self-powered hollow rotating body being immersed in said liquid.

* * * * *